United States Patent
Baur et al.

(10) Patent No.: US 7,162,111 B2
(45) Date of Patent: Jan. 9, 2007

(54) OPTICAL SEAT OCCUPATION SENSOR NETWORK

(75) Inventors: Richard Baur, Pfaffenhofen (DE); Hans-Peter Huber, Neu-Ulm (DE); Eberhard Zeeb, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/482,422

(22) PCT Filed: Jun. 10, 2002

(86) PCT No.: PCT/EP02/06298

§ 371 (c)(1),
(2), (4) Date: Jul. 9, 2004

(87) PCT Pub. No.: WO03/002380

PCT Pub. Date: Jan. 9, 2003

(65) Prior Publication Data

US 2004/0240776 A1  Dec. 2, 2004

(30) Foreign Application Priority Data

Jun. 27, 2001 (DE) ................................. 101 31 080

(51) Int. Cl.
*G02B 6/00* (2006.01)
(52) U.S. Cl. .......................................... 385/13; 385/12
(58) Field of Classification Search ................. 385/12, 385/13
See application file for complete search history.

(56) References Cited

U.S. PATENT DOCUMENTS

| | | | |
|---|---|---|---|
| 5,193,129 A * | 3/1993 | Kramer ........................ 385/13 |
| 5,988,676 A * | 11/1999 | Lotito et al. ................. 280/735 |
| 6,242,701 B1 * | 6/2001 | Breed et al. ................. 177/144 |
| 6,353,394 B1 * | 3/2002 | Maeda et al. ............... 340/667 |
| 6,555,766 B1 * | 4/2003 | Breed et al. ................. 177/144 |
| 6,765,194 B1 * | 7/2004 | Holz et al. .............. 250/227.12 |
| 6,782,316 B1 * | 8/2004 | Breed et al. ................... 701/49 |
| 6,784,379 B1 * | 8/2004 | Breed et al. ................. 177/144 |
| 7,043,997 B1 * | 5/2006 | Mattson et al. ............... 73/800 |
| 2003/0056997 A1 * | 3/2003 | Breed et al. ................. 177/144 |
| 2004/0136652 A1 * | 7/2004 | Groves-Kirkby ............. 385/37 |
| 2004/0247228 A1 * | 12/2004 | Murad et al. ................. 385/12 |
| 2005/0006151 A1 * | 1/2005 | Mattson et al. ................ 177/1 |
| 2005/0046584 A1 * | 3/2005 | Breed .................... 340/825.72 |
| 2006/0092023 A1 * | 5/2006 | Hofbeck et al. ............ 340/561 |

FOREIGN PATENT DOCUMENTS

| | | |
|---|---|---|
| DE | 197 54 166 A1 | 6/1999 |
| DE | 198 26 287 A1 | 12/1999 |
| DE | 198 56 549 A1 | 6/2000 |
| DE | 199 13 800 A1 | 10/2000 |
| DE | 100 45 689 A1 | 5/2001 |

* cited by examiner

*Primary Examiner*—Brian Healy
*Assistant Examiner*—Charlie Peng
(74) *Attorney, Agent, or Firm*—Akerman Senterfitt; Stephan A. Pendorf; Yonghong Chen

(57) ABSTRACT

The invention relates to a sensor arrangement for seat occupation detection, comprising a fiber-optic sensor network consisting of at least two sensors. The sensor network detest for example local damping modifications in a fiber network that are caused by microbends or modifications of the Bragg wavelength of fiber-optic Bragg grating sensors (FBGS) distributed in the fiber network that are ceased by loads. The optical sensor network is resistant to electromagnetic parasitic inductions. Due to the nature of the optical lass or polymer optical fibers it is for example possible to integrate the network into the textile cover of the seat or into a cushion.

11 Claims, 2 Drawing Sheets

OPTICAL SEAT OCCUPATION SENSOR NETWORK

CROSS REFERENCE TO RELATED APPLICATION

This application is a national stage of PCT/EP02/06298 filed Jun. 10, 2002 and based upon DE 101 31 080.3 filed Jun. 27, 2001 under the International Convention.

BACKGROUND OF THE INVENTION

1. Field of the Invention

The invention concerns a sensor network according to the precharacterizing portion of patent claim 1.

The present invention is concerned with the problem that, for the directed or proportionate activation of an airbag in a vehicle, it is of importance to have knowledge of the weight on the seat as well as the load distribution over the seat surface. The forcefulness of the airbag explosion should occur differentially based on the total weight of the occupants. If, in addition, the load distribution on the seat is known with high site-specificity, it also becomes possible therefrom to make a distinction between objects and persons on the seat.

2. Description of the Related Art

For sensing seat occupancy it is known to use, for example, seat mats in which an electrical resistance network is integrated. The weight information is determined from the changes in resistance of the resistance network.

A disadvantage of this system is that it is prone to error due to electromagnetic interference, for example, due to electrostatic discharge. Besides this, neither the total weight determination nor the determination of the spatial weight distribution are sufficiently precise for purposes of controlling a complex airbag system.

SUMMARY OF THE INVENTION

It is the task of the present invention to provide a sensor network for determination of seat occupancy, with which a directed controllable actuation of an airbag system in a vehicle can occur.

The invention is described in Claim 1. Advantageous embodiments and further developments are set forth in the dependent claims.

The invention has the advantage that an optical sensor network is employed that is resistant to electromagnetic interference.

It is further advantageous that during the occupancy of a seat by an object (for example a child seat) an airbag activation can be selectively prevented. If an adult person is on the seat, the weight distribution on the seat is used for determination of the position within the internal space and therewith used for directed or proportionate activation of a multi-airbag system.

BRIEF DESCRIPTION OF THE DRAWING

The invention is described by reference to illustrative embodiments with reference to schematic figures.

BRIEF DESCRIPTION OF THE DRAWING

The invention is based on the presumption that a fiber-optic sensor network comprising at least two sensors is employed as the sensor system which is resistant to electromagnetic interference. As a result of the composition of the optical glass or polymer light guides it is possible to integrate the network in, for example, the textile cover of a seat or a pillow.

Figure 1:
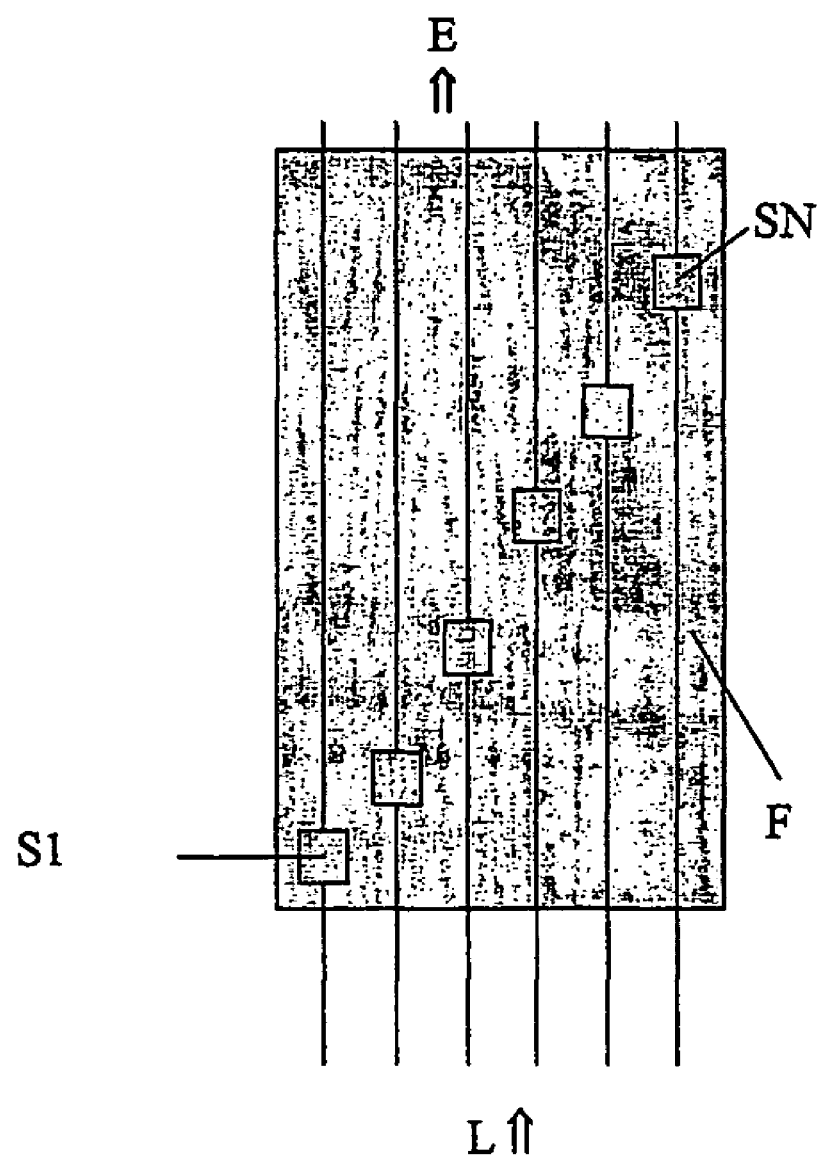
FIG. 1 shows an optical sensor network of micro-curvature sensors.

Sensors are used which detect or register, for example, local damping changes caused by microbends in a fiber network, or load-induced modifications of the Bragg wavelength of fiber-optic Bragg grating sensors (FBGS) distributed in the fiber network. The optical sensor network is impervious to electromagnetic parasitic inductions. If the sensor network is constructed of sensors of which the sensor effect is caused by damping effects, then a spatial resolution of the seat occupancy is possible by separate reading of the individual sensor branches. In FIG. 1 there is shown, for example, an optical sensor network of micro-curvature sensors S1 through SN. For each sensor one fiber line F leads to an individual detector in a detector plane E. The various sensor fiber lines are coupled to one or more light sources L.

Figure 2:
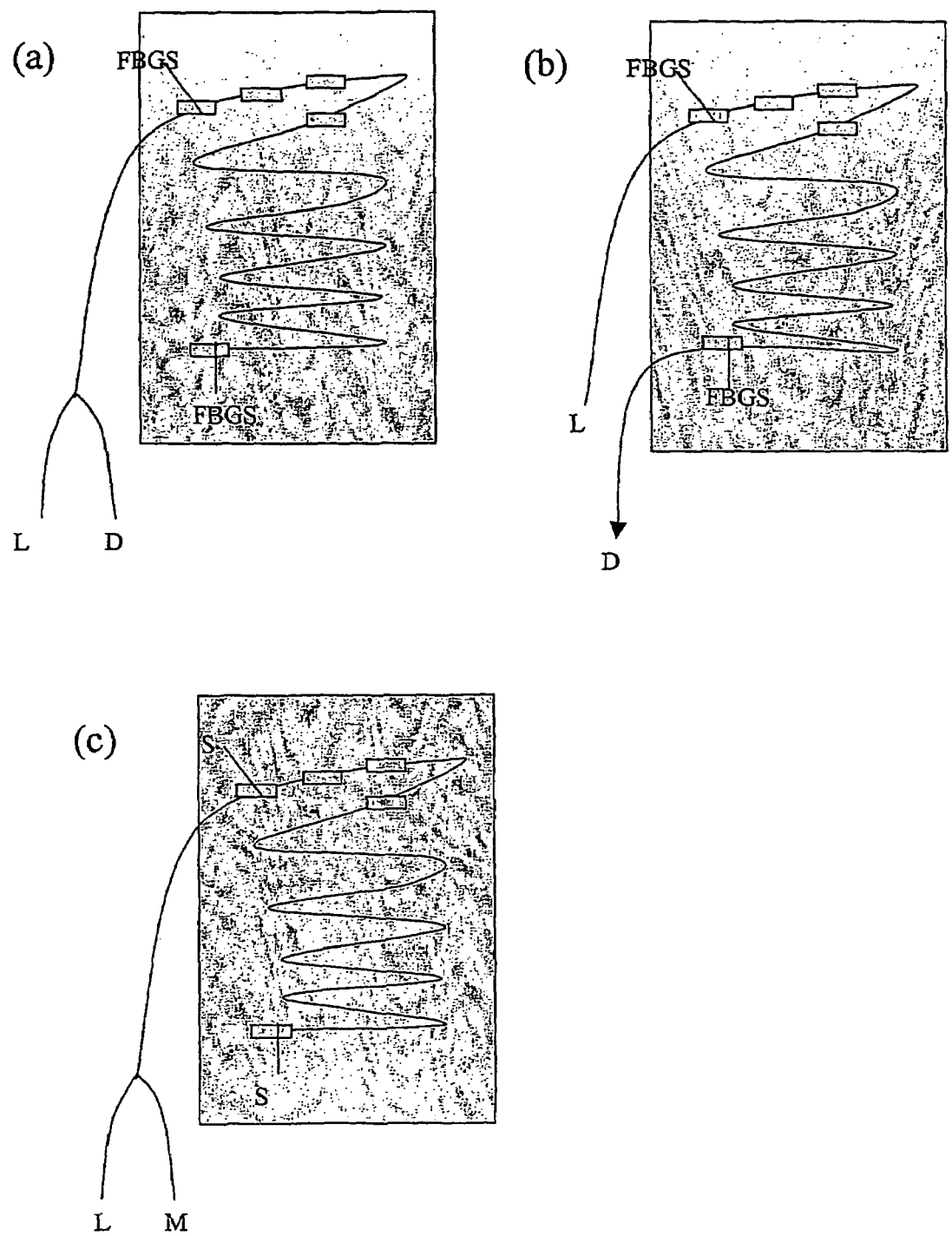
FIG. 2a, b, c show an optical sensor network with Bragg grating sensors or sensors which are responsive to a change in intensity.

In a further embodiment the spatial resolution for, for example, an fiber-optic Bragg grating sensor network according to FIG. 2a, b, occurs by the cascading of for example differing Bragg grating sensors FBGS with varying Bragg wavelengths. The cascading of the sensors reduces the number of the necessary detectors E. The coupling-in of light occurs via a light source L.

The Bragg grating sensors are either operated in reflection mode (FIG. 2a) or in transmission (FIG. 2b) mode.

The Bragg grating sensors are either operated with light source L and detector M in reflection mode (FIG. 2a) or in transmission (FIG. 2b) mode.

In the case of sensors operating based on cascading, which react for example to local damping changes (intensity changes) (FIG. 2c), the spatial resolution of the seat occupancy occurs by a locally resolved damping measurement processes (OTDR). The light is coupled-in via a light source L and measured at measuring device M.

The invention claimed is:

1. A sensor arrangement for detecting seat occupancy of a seat having a top seating surface area, wherein
    a fiber-optic sensor network including at least two sensors distributed in a fiber network in the top seating surface area, and
    wherein an analysis of seat load distribution can be made on the basis of changes in sensor signals.

2. The sensor arrangement according to claim 1, wherein the fiber-optic sensor network is integrated in the seat.

3. The sensor arrangement according to claim 1, wherein the sensors detect micro-curvatures and changes in damping caused thereby.

4. The sensor arrangement according to claim 1, wherein the sensors are Bragg grating sensors, which are operated either in reflection or transmission mode.

5. The sensor arrangement according to claim 1,
    wherein the optical sensor network is comprised of sensors (S1 through SN),
    wherein for each sensor a fiber line (F) in the fiber network leads to an individual detector in a detector plane (E),
    wherein light from one or more light sources (L) is coupled in to the various sensor fiber lines, and wherein a classifying or reading-out unit resolves the load distribution over the seating surface area by separately reading-out the individual sensor branches.

6. The sensor arrangement according to claim 1, wherein the sensors are arranged in a cascade arrangement and wherein the load distribution over the top seating surface area is determined by the cascading of individual sensors.

7. The sensor arrangement according to claim 1, wherein wherein the sensor network is woven into the cover of the seat.

8. The sensor arrangement according to claim 1, wherein the sensor network is integrated in a seat pillow.

9. The sensor arrangement according to claim 1, wherein the load distribution enables a determination of the position of a person seated on the seat.

10. A vehicle occupant active restraint system comprising:
a vehicle airbag passenger restraint system adapted to deploy in the event of a collision;
a sensor arrangement for detecting seat occupancy of a seat having a top seating surface area, the sensor arrangement having a fiber-optic sensor network including at least two sensors distributed in a fiber network in the top seating surface area;
an analysis module for determining seat load distribution on the basis of changes in sensor signals; and
an airbag deployment module receiving signals from said analysis module and sending signals to one or more airbag to deploy said one or more airbag with a forcefulness correlated to the seat load distribution determined by said analysis module.

11. The vehicle occupant active restraint system as in claim 10,
wherein said airbag passenger restraint system comprises two or more air bags associated with different areas of at least one vehicle seat, wherein each of said airbags is independently of the other adapted to deploy with a variable force according to a signal received by the airbag deployment module; and
wherein said airbag deployment module deploy each of said airbags with a force depending upon signals corresponding to the seat load distribution as determined by said analysis module.

* * * * *